US008225207B1

(12) United States Patent
Ramirez

(10) Patent No.: US 8,225,207 B1
(45) Date of Patent: Jul. 17, 2012

(54) COMPRESSION THRESHOLD CONTROL

(75) Inventor: Daniel Ramirez, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 1311 days.

(21) Appl. No.: 11/855,998

(22) Filed: Sep. 14, 2007

(51) Int. Cl.
G06F 3/00 (2006.01)
G06F 17/00 (2006.01)
G06F 3/048 (2006.01)

(52) U.S. Cl. ........ 715/716; 715/202; 715/204; 715/723; 715/823

(58) Field of Classification Search .................. 715/716, 715/202, 204, 723, 823; 381/56, 61
See application file for complete search history.

(56) References Cited

U.S. PATENT DOCUMENTS 5,204,969 A * 4/1993 Capps et al. .................. 704/278
2005/0175194 A1* 8/2005 Anderson ..................... 381/106
2006/0150072 A1* 7/2006 Salvucci ..................... 715/500.1
2008/0041220 A1* 2/2008 Foust et al. ..................... 84/625

OTHER PUBLICATIONS

Adobe Premiere Pro 2.0 Published by Adobe Press Pub. Date: Feb. 17, 2006.*

* cited by examiner

Primary Examiner — Boris Pesin
Assistant Examiner — Rinna Yi
(74) Attorney, Agent, or Firm — Fish & Richardson P.C.

(57) ABSTRACT

Systems and methods for audio editing are provided. In one implementation, a computer-implemented method is provided. The method includes receiving digital audio data and displaying a representation of the received digital audio data as an audio waveform. The display also includes a representation of one or more controls for applying one or more effects to the digital audio data. A user input is received manipulating a first control relative to the audio waveform. The displayed representation of the audio waveform is modified according to the relative position of the first control and a corresponding effect is applied to the digital audio data. The modified digital audio data is then made available for further processing.

21 Claims, 7 Drawing Sheets

COMPRESSION THRESHOLD CONTROL

BACKGROUND

The present disclosure relates to editing digital audio data.

Digital audio data can include audio data in different digital audio tracks. Tracks are typically distinct audio files. However, a single track can contain multiple audio files (e.g., clips) where each audio file is placed at a different place in time within the track. Tracks can be generated mechanically (e.g., using a distinct microphone as an input source for each track), synthesized (e.g., using a digital synthesizer), or generated as a combination of any number of individual tracks.

A track includes one or more channels (e.g., a stereo track can include two channels, left and right). A channel is a stream of audio samples. For example, a channel can be generated by converting an analog input from a microphone into digital samples using a digital analog converter.

The audio data for a track can be displayed in various visual representations. For example, an amplitude display shows a representation of audio intensity (e.g., a waveform having both positive and negative amplitudes), in the time-domain (e.g., a graphical display with time on the x-axis and amplitude on the y-axis). Similarly, a frequency spectrogram shows a representation of frequencies of the audio data in the time-domain (e.g., a graphical display with time on the x-axis and frequency on the y-axis). Tracks can be played and analyzed alone or in combination with other tracks.

Additionally, the audio data of one or more tracks can be edited. For example, when the dynamic range of the audio data, measured in decibels ("dB"), is greater (e.g., 50 dB) than the dynamic range of the recording device or the sound system (e.g., 20 dB), the audio data will become distorted when recorded or reproduced (e.g., deformation of a waveform output as compared to the waveform input) on another device. To lessen distortion, the dynamic range of the audio data can be edited (or adjusted) by varying the gain, or volume of the audio data.

Gain reduction can be performed manually (e.g., by hand-adjusting faders), or by using a compressor which automatically controls the volume of the audio data (e.g., by decreasing gain as the input amount of audio data increases), through the use of one or more controls (e.g., input level, output level, threshold, ratio, attack time, and release time). The use of a compressor to control the gain of audio data is typically referred to as compression.

SUMMARY

In general, in one aspect, a computer-implemented method is provided. The computer-implemented method includes receiving digital audio data and displaying a representation of the received digital audio data as an audio waveform. The display also includes a representation of one or more controls for applying one or more effects to the digital audio data. A user input is received manipulating a first control relative to the audio waveform. The displayed representation of the audio waveform is modified according to the relative position of the first control and a corresponding effect is applied to the digital audio data. The modified digital audio data is then made available for further processing and output (e.g., editing, displaying, or storing).

Embodiments of this aspect can include apparatus, systems, and computer program products.

Implementations of the aspect can include one or more of the following features. Applying the effect to the audio waveform can include moving the horizontal bar according to user input toward the audio waveform such that when the representation of the horizontal bar overlaps with the maximum amplitude displayed in the audio waveform, the effect is applied. The amount of the effect applied to the audio waveform can correspond to a position of the horizontal bar such that a maximum amount of the effect is applied when the horizontal bar is moved to a minimum amplitude of the audio waveform.

The effect can be a compression effect, and applying the compression effect to the audio waveform can include applying the compression effect as determined by one or more of a threshold level, a ratio, and an output gain amount. When the compression effect is applied to the audio waveform, an amount of make-up gain can be automatically applied. A second control can be a ratio control with a movable measure, and applying the effect to the audio waveform can include moving the measure in a first direction to apply a first amount of the effect, and moving the measure in a second direction to apply a second amount of the effect.

A first user-interactive graphic depiction of the one or more effects can include a second horizontal bar where the first horizontal bar is displayed above the audio waveform, the second horizontal bar is displayed below the audio waveform, and movement of the first horizontal bar causes a mirror movement of the second horizontal bar, causing the effect to be applied equally to both sides of the audio waveform. Only half of the audio waveform can be displayed, where the displayed half of the audio waveform represents both sides of the audio waveform, the first user-interactive graphic depiction of the one or more effects is a horizontal bar displayed above the audio waveform, and movement of the horizontal bar represents an equal and concurrent application of an effect to both sides of the audio waveform.

Particular embodiments of the subject matter described in this specification can be implemented to realize one or more of the following advantages. An editing control, for example a compression control, can be manipulated relative to a visual representation of audio data such that a user can view changes to the audio data caused by the editing control as they occur. This eliminates the need to separately apply an editing process and then analyze the resultant waveform. Additionally, the user is provided with a visual reference while they are using the editing control. Furthermore, the editing controls can be automatically displayed along with the visual representation, providing the user with simplified editing processes.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
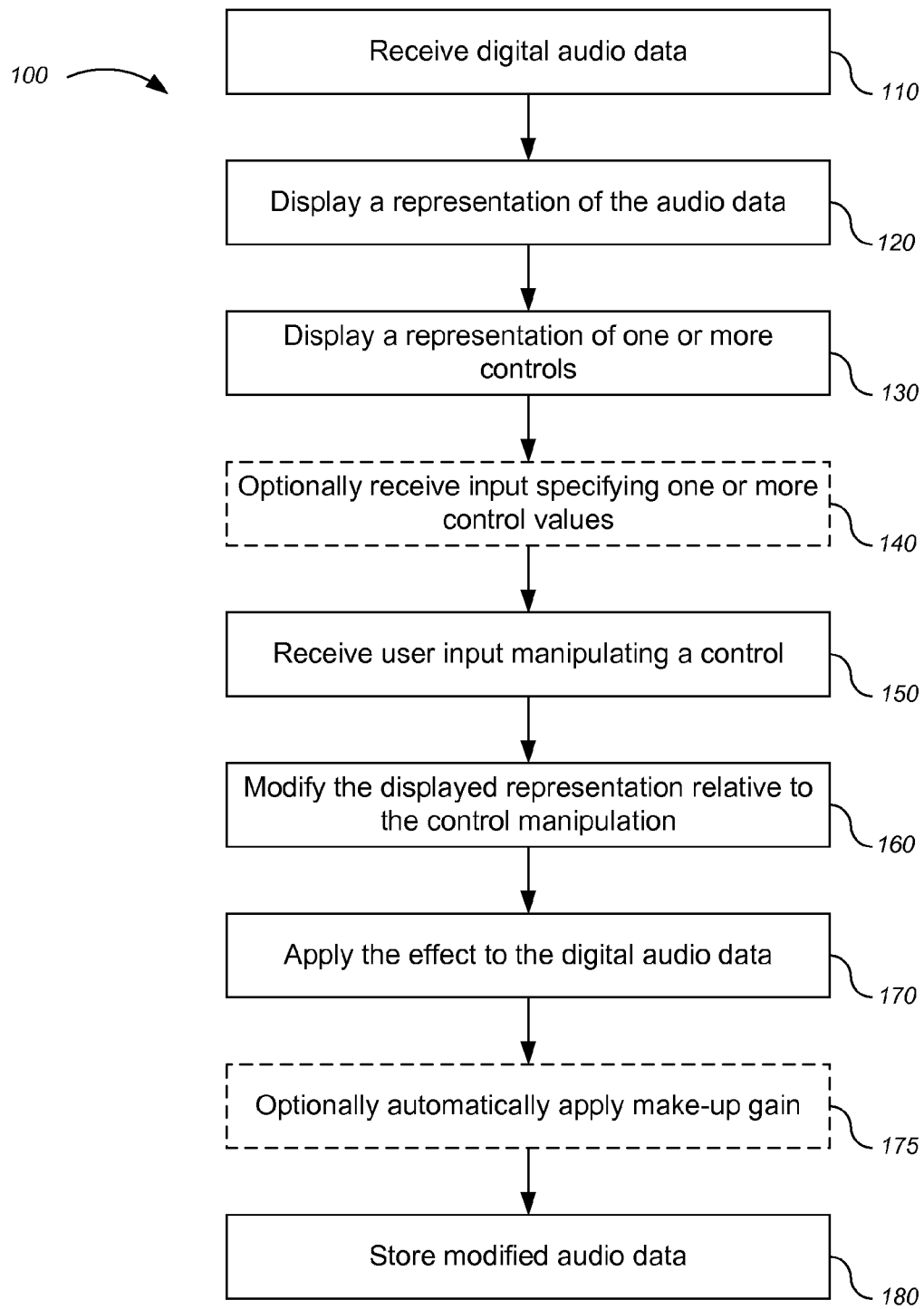
FIG. 1 shows a flowchart of an example method for applying compression to audio data.

FIG. 1 shows a flowchart of an example method 100 for applying compression to an amplitude waveform. For convenience, the method 100 will be described with reference to a system that performs the method 100. The system receives 110 audio data, e.g., as incorporated into a single track. For example, the audio data can be initially stored on a single track. Alternatively, the received track can be, for example, a mixdown track that is a combination of multiple tracks. The audio data can be received in response to a user input to the system selecting particular audio data to edit. The audio data can also be received for other purposes (e.g., for review by the user). In some implementations, the system receives the audio data from a storage device local or remote to the system.

The system displays 120 a representation of the audio data (e.g., as an audio waveform). For example, the system can display a visual representation of each individual track with respect to a feature of the audio data (e.g., amplitude or frequency), on a feature axis and with respect to time (e.g., in seconds), on a time axis.

The system also displays 130 one or more controls. The controls can be used to apply effects to the audio data. For example, controls can be displayed for applying a gain, a compression, echo, pitch shift, or other effects to a portion or all of the displayed audio data.

Figure 2:
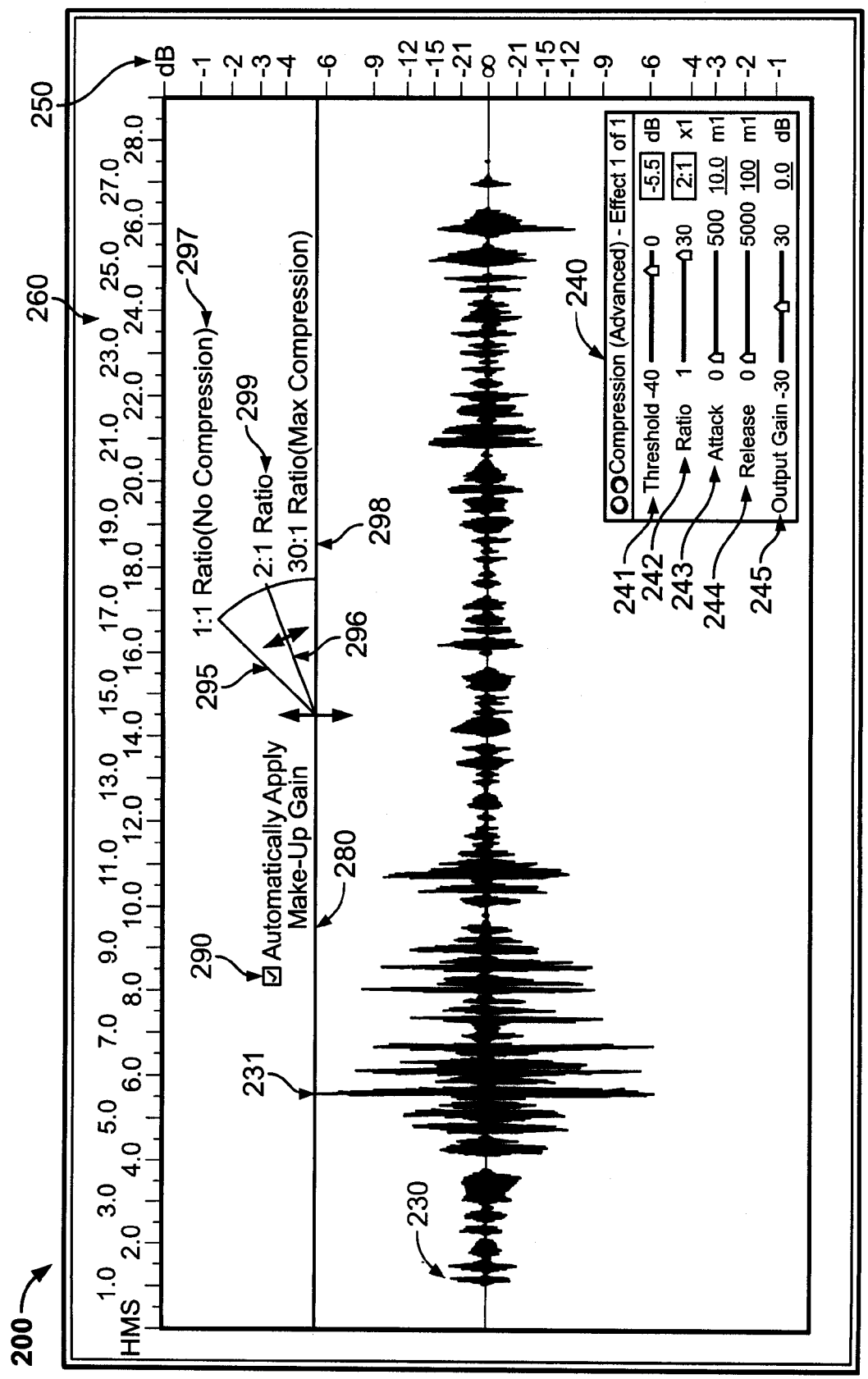
FIG. 2 shows an example display of a compression control relative to an amplitude waveform.

FIG. 2 shows an example display 200 of a compression control with respect to a display of the audio data as an audio waveform, particularly as an amplitude waveform 230. The display 200 includes a visual representation of audio data contained within a track. The display 200 includes a feature axis 250 (e.g., representing amplitude), and a time axis 260. The audio data can correspond to particular audio sources, (e.g., voices, music, or noise). The display 200 shows the audio data represented as an amplitude waveform 230. However, in other implementations the audio data can be displayed in various visual representations including a frequency spectrogram, pan position, and phase diagram.

In addition to displaying the amplitude waveform 230, the display 200 also includes representations of the different controls that can be used for applying effects to the audio data. For example, the display 200 includes a compression control. The compression control can be represented by a user-interactive horizontal bar 280, which is described in greater detail below. The compression control also includes a compressor interface 240. The compressor interface 240 can include additional controls used to apply different combinations of effects to the audio data represented by the amplitude waveform 230. In some implementations, the additional controls on the compressor interface 240 include a threshold 241, a ratio 242, an attack time 243, a release time 244, and an output gain 245, each of which is described in greater detail below.

The threshold 241 identifies a set point (e.g., a dB or amplitude level), at which the compressor will begin to affect the audio data (e.g., peaks of an audio signal). Incoming amplitude levels of the audio signal below the set threshold will not be processed. Incoming amplitude levels of the audio signal above the set threshold are compressed according to the compression ratio 242. The compression ratio 242 is the ratio of the input audio signal to the output audio signal after the application of compression (e.g., 4:1 ratio means that the compressor will attenuate the signal 3 dB for every 4 dB over the threshold. In other words, a 4 dB increase in amplitude (over the threshold) will result in a 1 dB increase in overall amplitude.).

The output gain 245 is the amount of gain applied to the audio signal output after the application of compression. The attack time 243 is the amount of time it takes to react to (e.g., to reduce the amplitude of), an incoming audio signal above the threshold. For example, a 20 to 50 millisecond attack time when applied to an incoming audio signal from an electric bass will allow a short burst of sound to occur before the amplitude is reduced. The release time 244, is the amount of time compression will be applied after the audio signal goes below the threshold (e.g., how quickly the volume comes back up when the input is no longer above the threshold). For example, a 20 to 50 millisecond release time will create a more aggressive sound, and an 80 to 100 millisecond release time will create a more sustained sound.

In some implementations, a ratio control 295 is also displayed. The ratio control 295 controls the compression ratio for the compression control. The ratio control 295 includes a user-interactive movable measure 296 (e.g., a line) that can be moved to any position within the ratio control 295. The movable measure 296 is shown as a line having a constant endpoint such that it is moved along an arc between a specified minimum compression ratio 297 and a specified maximum compression ratio 298. Thus, for example, a particular angle formed by the position of the movable measure 296 with respect to a horizontal axis corresponds to particular compression ratio. For example, the movable measure 296 can be moved to a position 297 (e.g., maximum angle), to apply the least amount of compression to the audio data (e.g., 1:1). To indicate a higher ratio, the line 296 can be moved to another position 298 (e.g., minimum angle) to apply the greatest amount of compression to the audio data (e.g., 30:1).

Additionally, when the line 296 is positioned at a center of the ratio control 295, then the compression ratio is 2:1 (e.g., when the threshold is −20 dB, if the input is −10 dB, the output level is −15 dB), and the audible difference between the input audio signal and the output audio signal is minimally distinguishable. When the line 296 is placed at the bottom 298 of the ratio control 295, the compression ratio is 30:1 (e.g., when the threshold is −20 dB, if the input is −10 dB, the output level is substantially −20.3 dB), and the audible difference between the input audio signal and the output audio signal is distinguishable. The higher the ratio, the more extreme the compression will be. For example, ratios from 2:1 through 6:1 are considered "soft" and ratios above 6:1 are considered "hard" or "limiting". Other user-interactive controls can be provided for modifying the compression ratio including an input box for entering a specific compression ratio value.

When the compression ratio is set to the maximum amount, the full amount of compression (i.e., gain reduction) is applied to the audio data when the amplitude of the audio signal reaches the threshold level. This type of compression is known as "hard knee" compression and it is very assertive and audibly distinct. In contrast, "soft knee" compression is less assertive; allowing a gradual increase in the amount of compression applied to the audio signal, as the audio signal approaches the threshold. Additionally, a higher compression ratio (e.g., ∞:1) results in "brickwall limiting". In brickwall limiting, the amplitude of the audio signal peaks above the threshold level are always attenuated to the threshold level.

Once the amplitude of the audio signal passes the specified threshold level, the compression ratio set by the user is applied.

In some implementations, a make-up gain can be applied following compression of particular audio data. Applying make-up gain is a technique for lessening the audible difference between the input audio signal and the output audio signal. Applying make-up gain reduces the dynamic range of the audio data. In some implementations, the display 200 includes a user selectable automatic make-up gain control 290 (e.g., as a selectable check box). If the user selects this option, an amount of make-up gain is automatically applied to the entire audio data after the application of the compression. Thus, as compression reduces the dynamic range of the audio data by attenuating the peaks of the audio the signal, amplification of the audio data is added to the entire audio signal.

The amount of make-up gain applied to the audio data can be a constant level that does not change (e.g., hard-coded into the application for use with all audio data) or based on the output gain amount 245 specified by the user. If the user does not select the automatic make-up gain option 290, no make-up gain is automatically applied to the audio data following an application of compression. However, the user can manually apply any amount of make-up gain to a portion or all of the audio data as part of a separate editing operation. Additionally, the user can optionally change (e.g., override) the use or amount of predetermined make-up gain.

The compression control is represented by a user-interactive horizontal bar 280. In some implementations, the horizontal bar 280 is positioned on the feature axis 250 (e.g., amplitude scale) and will always be visible to the user. In other implementations, when the horizontal bar 280 is manipulated, it will extend across the display with respect to time, becoming partially transparent when no manipulation is occurring. The horizontal bar 280 can be moved along the feature axis (e.g., up and down) in order to apply compression to a portion or all of the audio data.

When the user manipulates the horizontal bar 280 relative to the amplitude waveform 230, such that the horizontal bar 280 overlaps a portion of the amplitude waveform 230, an amount of compression is applied to the audio data according to the settings on the compression interface 240, the automatic make-up gain 290, the ratio control 295 and any other settings associated with the compression control. Because an amplitude waveform has both a positive and a negative amplitude (i.e., amplitude values extending up and down from a center zero point), movement of the horizontal bar 280 (e.g., downward from the positive side of the waveform) will effect both the positive and negative amplitude values of the waveform equally. The vertical position of the horizontal bar 280 corresponds to the threshold level 241.

When applying compression, the application of any combination of user-defined and/or predefined controls is possible. Additionally, the compression interface 240 can include a fewer or a greater number of controls having values that can be specified by a user.

For example, in some implementations, the application of compression to the audio data includes the application of a user specified threshold level 241, ratio 242, and output gain amount 245, where the application of an attack time and a release time are predefined (e.g., hard-coded into the application). In other implementations, the application of compression includes the application of a user-defined threshold level 241, while the application of the ratio, output gain amount, attack time, and release time are predefined. In some implementations, a user can change any predefined setting or combination of settings in order to provide a user specified value for the controls.

In some implementations, the user manipulates one or more controls in order to edit the audio data. As shown in FIG. 1, the system optionally receives 140 an input specifying one or more control values. In some implementations, the user provides an input that defines how an effect is to be applied to the audio data. For example, the user can adjust values associated with one or more controls on a compressor interface (e.g., compressor interface 240), select an automatic application of make-gain (e.g., using check box 290), or adjust a ratio control (e.g., ratio control 295), for example, from a 2:1 compression ratio to a 30:1 compression ratio. In some implementations, the application of an effect to the audio data is predefined by the system. Once the compressor interface controls, automatic make-up gain and ratio controls are set (e.g., by the user or the system), the user can manipulate 150 the compression control (e.g., horizontal bar 280). In some implementations, manipulation of the compression control will affect an aspect of the compressor interface (e.g., change the indicated threshold amount) as described below with respect to FIGS. 6 and 7.

The user manipulates 150 the compression control, for example, by moving a horizontal bar (e.g., horizontal bar 280) along the feature axis toward a displayed audio waveform (e.g., audio waveform 230). When the horizontal bar comes in contact with the portion of the audio waveform having the greatest amplitude, the compression becomes active (e.g., when the representation of the compression control partially overlaps the audio waveform). For example, as shown in FIG. 2, the audio waveform 230 has a peak amplitude 231. When the horizontal bar 280 contacts the peak amplitude 231 the compression becomes active. Thus, no compression will occur when the bar is above the highest peak 231 in the audio waveform 230 (e.g., by 1 pixel in the display), and maximum compression will occur when the horizontal bar 280 is manipulated into a maximum position (e.g., the center of the amplitude waveform).

As the user moves the horizontal bar, the system automatically modifies 160 the displayed amplitude waveform representation of the audio data according to the settings on the compression interface (e.g., compression interface 240), the automatic make up gain, the ratio control and any other settings associated with the compression control.

As the horizontal bar is moved towards the center of the amplitude waveform, all peaks which extend beyond the threshold (e.g., horizontal bar) will be visually altered in the display (e.g., removed, shaded, or truncated) to reflect the attenuation of the audio data according to the specified compression ratio.

The system also applies the effect 170 to the audio data (e.g., compress or limit the amplification of the audio signal). The effect that the system applies to the audio data corresponds to the modification of the displayed representation of the amplitude waveform. The displayed representation of the amplitude waveform is modified according to the position of the compression control relative to the amplitude waveform. The displayed representation is the most current representation of the amplitude waveform, allowing the user to see the transformation of the amplitude waveform and hear the transformation of the related audio data, as the effect (e.g., compression) is being applied.

In some implementations, the audio data can be modified as the control is being manipulated with respect to the amplitude waveform (e.g., the underlying audio data is constantly changing as the movement control of the mouse button is pressed). Alternatively, the audio data is not modified until the user has released the control with respect to the amplitude waveform, (e.g., the underlying audio data does not change until the movement control of a mouse button is released).

The system optionally applies 175 a make-up gain to the audio data. For example, a make-up gain can be automatically applied as part of the application of the compression control. Alternatively, the application of the make-up gain can be user controlled (e.g., using, for example, selecting make-up gain 290 check box). Upon receiving a user input manipulating the compression control, the displayed representation of the amplitude waveform is modified relative to the control manipulation. Any selected effect and respective control value is also applied to the corresponding digital audio data. For example, when the user has selected the optional application of automatic make-up gain, as the user manipulates the compression control (e.g., the horizontal bar), an amount of compression is applied to the audio data and the displayed representation of the amplitude waveform is simultaneously altered.

Additionally, because the user has selected the optional application of automatic make-up gain, an amount of make-up gain is automatically applied to the compressed audio data without any further user interaction. Thus the automatic application of make-up gain will further modify the displayed representation of the amplitude waveform (e.g., visually widen the amplitude waveform) and the related audio data (e.g., audibly amplify the audio data). In some implementations, the user is able to see the transformation of the amplitude waveform as the effect (e.g., make-up gain) is being applied.

After applying the effect (e.g., compression), the system stores 180 the audio data for future use or manipulation. In some implementations, the user can choose to store the audio data in one of several states (e.g., the original form, with an amount of applied compression, or with an amount of applied compression and automatic make-up gain).

Figure 3:
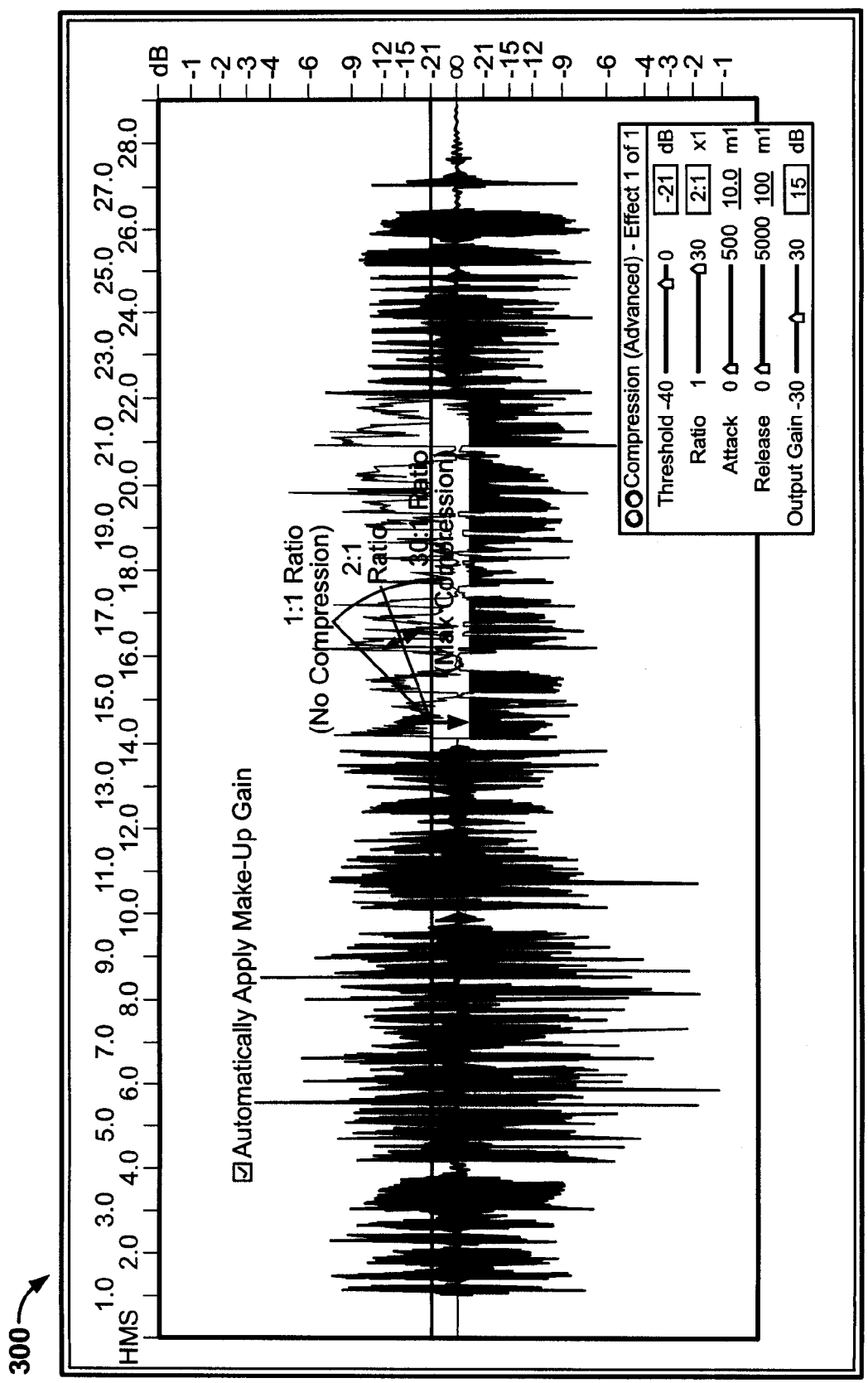
FIG. 3 shows an example display of a compression control modifying the amplitude waveform, where the selected make-up gain is automatically applied.

FIG. 3 shows an example display 300 of a compression control applied to an amplitude waveform. In FIG. 3, the user has selected to automatically apply an amount of make-up gain to the amplitude waveform after the compression control (horizontal bar) has been manipulated relative to the amplitude waveform applying a compression amount to the audio data. The displayed amplitude waveform has been modified to reflect the compression applied by the compression control. In some implementations, the amplitude waveform is substantially continuously modified as the position of the compression control changes relative to the amplitude waveform.

Additionally, because the user has chosen the automatic application of make-up gain, a make-up gain amount is automatically applied, further changing the visual representation of the amplitude waveform and the corresponding audio data. In some implementations, the make-up gain effect is simultaneously reflected in the displayed representation of the amplitude waveform as the compression is applied. In other implementations, the make-up gain effect is reflected in the displayed representation of the amplitude waveform after the compression is applied.

Figure 4:
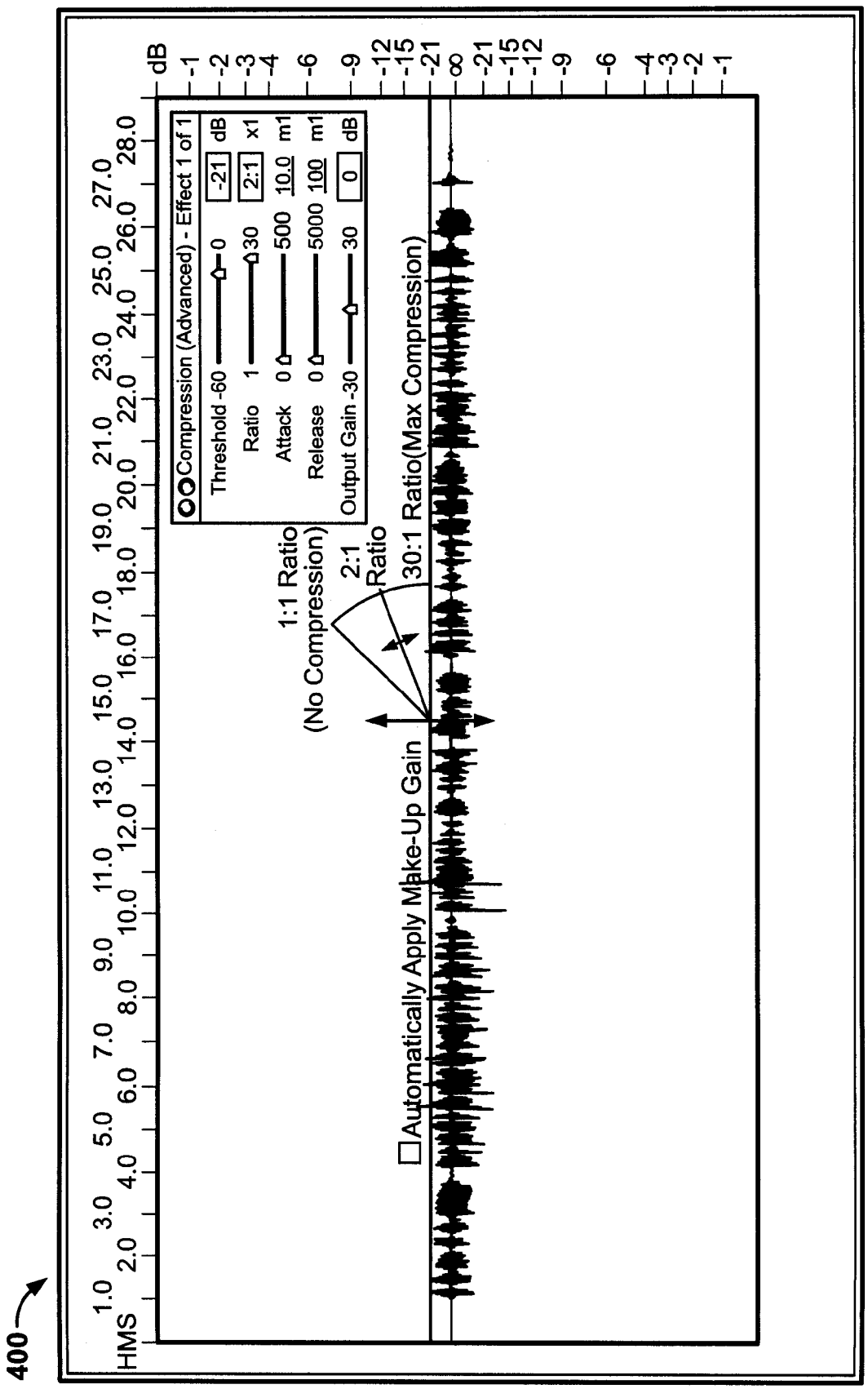
FIG. 4 shows an example display of a compression control changing the amplitude waveform, where the make-up gain is not selected and not applied.

FIG. 4 also shows an example display 400 of a compression control with an optional selection box for the automatic application of make-up gain. In FIG. 4, however, the user has not selected to automatically apply an amount of make-up gain to the audio data. Because the user has not chosen the automatic application of make-up gain, make-up gain is not automatically applied to the compressed signal. Consequently, the audio signal appears visually smaller and will be audibly quieter.

Figure 5:
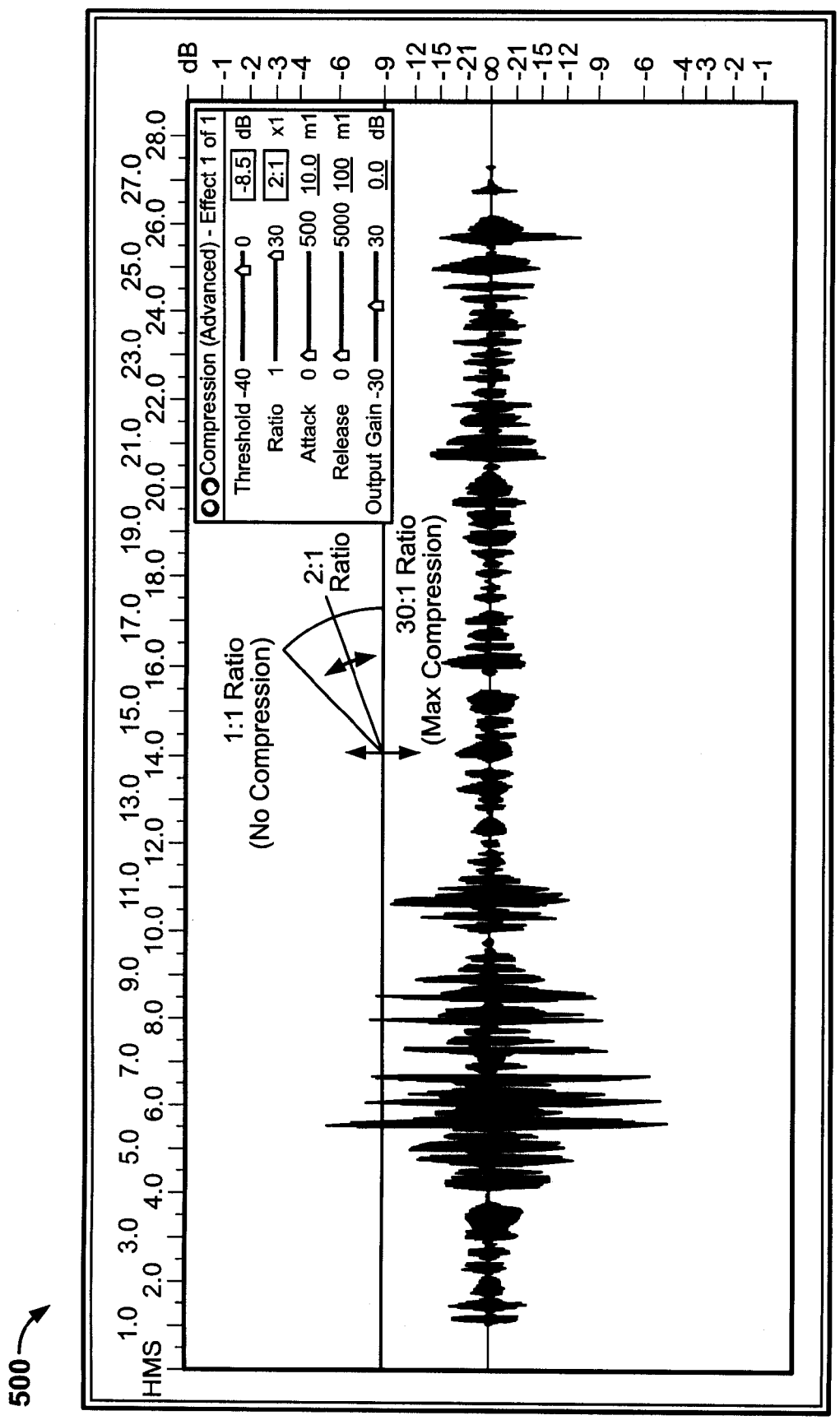
FIG. 5 shows an example of a ratio control in addition to a compression control.

FIG. 5 shows an example display 500 of a compression control including an optional ratio control in addition to a compression control. FIG. 5 does not include the optional selection box for the automatic application of make up gain. As described above the ratio control includes a movable measure (e.g., a line), having a constant endpoint such that it is moved along an arc between a specified minimum compression ratio and a specified maximum compression ratio. Movement of the line changes the compression ratio in the manner described above with respect to FIG. 2.

Figure 6:
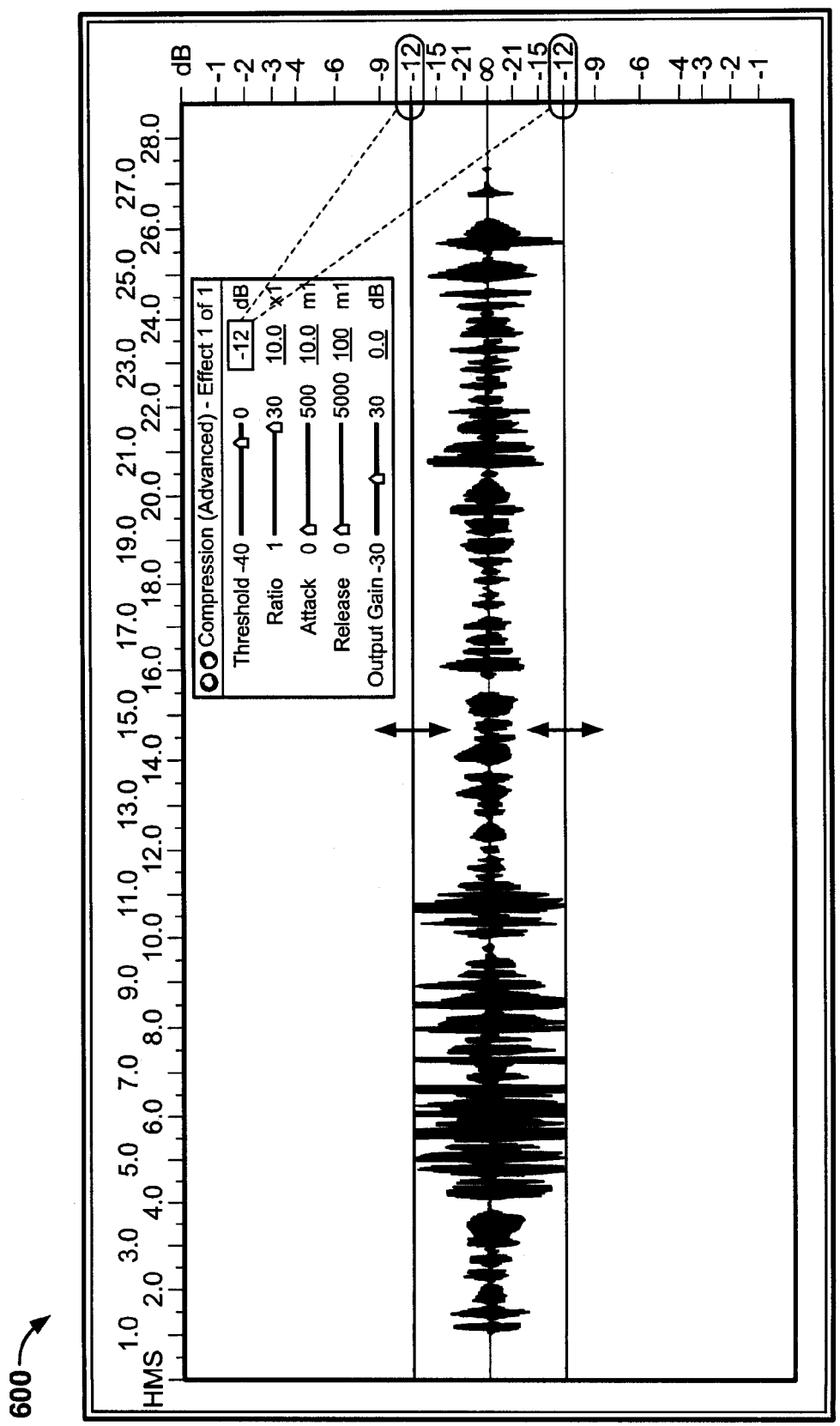
FIG. 6 shows an example of two compression controls changing an amplitude waveform.

FIG. 6 shows an example display 600 of a compression control provided by two horizontal bars for changing the audio data. In some implementations, the amplitude waveform is displayed with both positive and negative amplitudes represented. The user manipulates the compression control by moving a horizontal bar along the feature axis toward a displayed amplitude waveform. Because the amplitude waveform is displayed with both positive and negative amplitudes represented, two compression controls (e.g., two horizontal bars) can be displayed, with one horizontal bar on either side of the amplitude waveform. Movement of either horizontal bar causes mirror movement in the other, effecting both the positive and negative amplitudes of the amplitude waveform in the same manner.

In some implementations, manipulation of the compression control (horizontal bar) modifies an aspect of the compressor interface (e.g., changes the indicated threshold amount). For example, FIG. 6 shows a correlation between the threshold indication on the compressor interface and the position of the horizontal bar relative to the amplitude axis. As the horizontal bars are manipulated, the threshold amount in the compressor interface changes accordingly. For example, when the horizontal bar is moved to −12 dB, the threshold amount indicated in the compressor interface is −12 dB. As the horizontal bar is raised from −12 dB to −3 dB, the threshold amount indicated in the compressor interface changes to −3 dB. In some implementations, when no make-up gain is added to the amplitude waveform, the threshold value is the same as the relationship of the horizontal bar to the amplitude axis. In other implementations, when an amount of make-up gain is added, the threshold value is more closely related to the movement of the horizontal bar.

Figure 7:
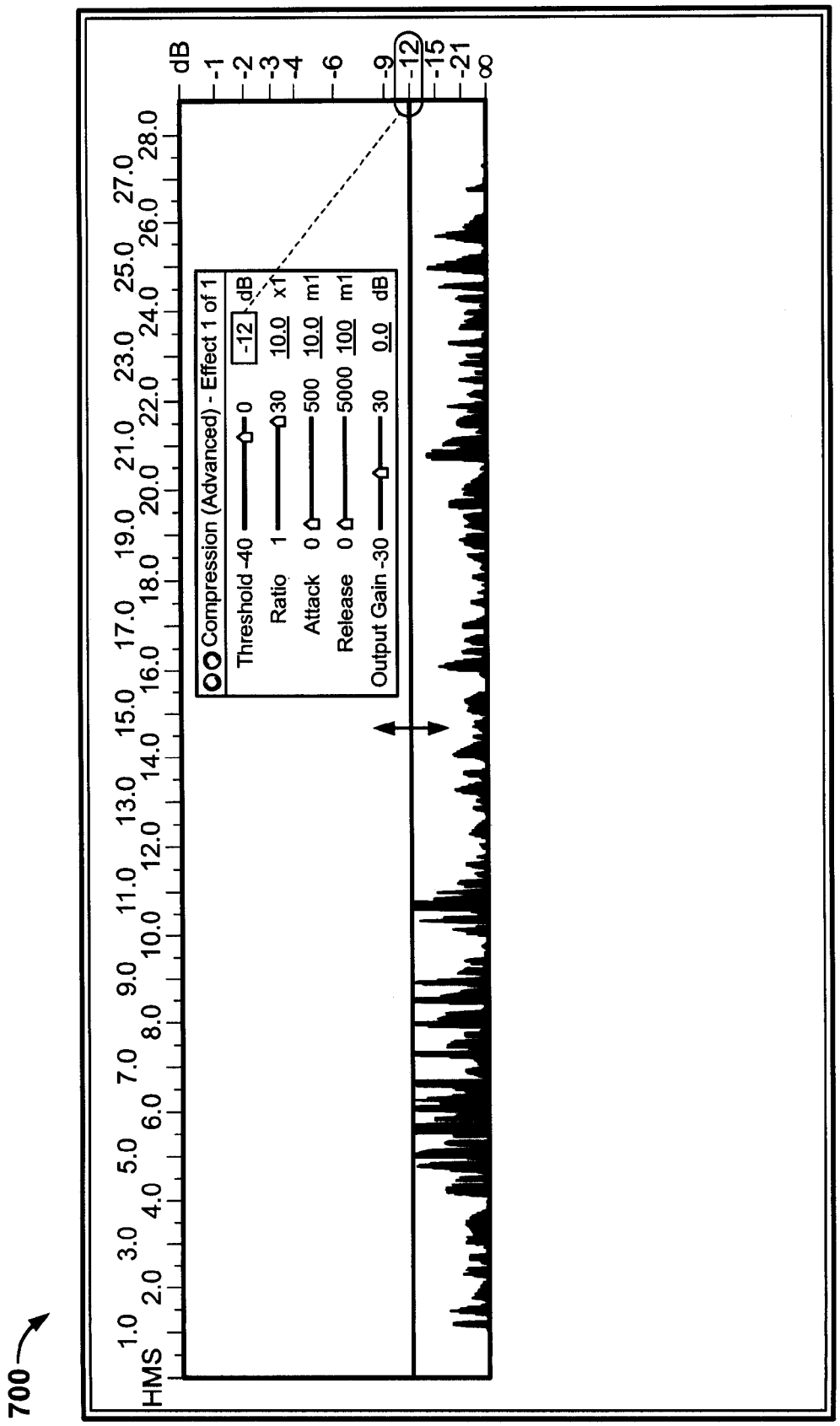
FIG. 7 shows an example of one compression control being applied to an amplitude waveform, where the amplitude waveform is shown using the absolute value of the amplitude.

FIG. 7 shows an example of one compression control being manipulated with respect to the amplitude waveform, where the amplitude waveform is shown using the absolute value of the amplitude over time. An amplitude waveform may be displayed with both positive and negative amplitudes represented. However, in some implementations, the waveform is displayed as an absolute value of the amplitude (e.g., to use less space in the display), such that only the positive amplitude is represented. Movement of a single compression control (e.g., horizontal bar) affects the entire audio date even though only half is displayed.

Any combination of controls may be chosen by the user or predetermined by the system. Additionally, in some implementations, the user can modify one or more predefined control values. The display of the controls is optional, and selectable. For example, the system (by default or based on a user-selection) can display the compression tool (e.g., represented by the horizontal bar) alone or with one or more other controls (e.g., the compressor interface, the ratio control, or the automatic make-up gain selection box). Additionally, other controls may be added to the user interface or the compressor interface (e.g., imported into the system), to reflect additional optional effects which can be applied to the audio data.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving digital audio data;
displaying a representation of received digital audio data as an audio waveform;
displaying a representation of one or more controls for applying one or more effects to the digital audio data;
receiving an input manipulating a first control relative to the audio waveform;
modifying the displayed representation of the audio waveform according to the position of the first control relative to a maximum amplitude of the representation of the audio waveform, wherein the representation of the audio waveform is modified to represent an application of an effect based on the relative position of the first control;
applying the effect to the digital audio data, the application of the effect corresponding to the modified displayed representation of the audio waveform, wherein an amount of the effect is based on a second control, the second control being a ratio control with a movable measure, and wherein moving the measure in a first direction applies a first amount of the effect and moving the measure in a second direction applies a second amount of the effect; and
making the modified digital audio data available for further processing and output.

2. The method of claim 1, where the first control is a horizontal bar, and wherein applying the effect to the audio waveform includes:
moving the horizontal bar according to user input toward the audio waveform such that when the representation of the horizontal bar overlaps with the maximum amplitude displayed in the audio waveform, the representation of the audio waveform is modified.

3. The method of claim 2, where the amount of the effect applied to the audio waveform corresponds to a position of the horizontal bar such that:
a maximum amount of the effect is applied when the horizontal bar is moved to a minimum amplitude of the audio waveform.

4. The method of claim 1, where the effect is a compression effect and applying the compression effect to the audio waveform includes applying the compression effect as determined by one or more of a threshold level, a ratio, and an output gain amount.

5. The method of claim 4, where when the compression effect is applied to the audio waveform, an amount of make-up gain is automatically applied.

6. The method of claim 2, where a first user-interactive graphic depiction of the one or more effects includes a second horizontal bar, such that:
the first horizontal bar is displayed above the audio waveform,
the second horizontal bar is displayed below the audio waveform, and
movement of the first horizontal bar causes a mirror movement of the second horizontal bar, causing the effect to be applied equally to both sides of the audio waveform.

7. The method of claim 1, where only half of the audio waveform is displayed, such that:
the displayed half of the audio waveform represents both sides of the audio waveform,
the first user-interactive graphic depiction of the one or more effects is a horizontal bar displayed above the audio waveform, and
movement of the horizontal bar represents an equal and concurrent application of an effect to both sides of the audio waveform.

8. A computer program product, encoded on a non-transitory computer-readable medium, operable to cause data processing apparatus to perform operations comprising:
receiving digital audio data; displaying a representation of received digital audio data as an audio waveform;
displaying a representation of one or more controls for applying one or more effects to the digital audio data;
receiving an input manipulating a first control relative to the audio waveform;
modifying the displayed representation of the audio waveform according to the position of the first control relative to a maximum amplitude of the representation of the audio waveform, wherein the representation of the audio waveform is modified to represent an application of an effect based on the relative position of the first control;
applying the effect to the digital audio data, the application of the effect corresponding to the modified displayed representation of the audio waveform, wherein an amount of the effect is based on a second control, the second control being a ratio control with a movable measure, and wherein moving the measure in a first direction applies a first amount of the effect and moving the measure in a second direction applies a second amount of the effect; and
making the modified digital audio data available for further processing and output.

9. The computer program product of claim 8, where the first control is a horizontal bar, and wherein applying the effect to the audio waveform includes:
moving the horizontal bar according to user input toward the audio waveform such that when the representation of the horizontal bar overlaps with the maximum amplitude displayed in the audio waveform, the effect is applied.

10. The computer program product of claim 9, where the amount of the effect applied to the audio waveform corresponds to a position of the horizontal bar such that:
a maximum amount of the effect is applied when the horizontal bar is moved to a minimum amplitude of the audio waveform.

11. The computer program product of claim 8, where the effect is a compression effect and applying the compression effect to the audio waveform includes applying the compression effect as determined by one or more of a threshold level, a ratio, and an output gain amount.

12. The computer program product of claim 11, where when the compression effect is applied to the audio waveform, an amount of make-up gain is automatically applied.

13. The computer program product of claim 9, where a first user-interactive graphic depiction of the one or more effects includes a second horizontal bar, such that:

the first horizontal bar is displayed above the audio waveform, the second horizontal bar is displayed below the audio waveform, and movement of the first horizontal bar causes a mirror movement of the second horizontal bar, causing the effect to be applied equally to both sides of the audio waveform.

14. The computer program product of claim 8, where only half of the audio waveform is displayed, such that:

the displayed half of the audio waveform represents both sides of the audio waveform, the first user-interactive graphic depiction of the one or more effects is a horizontal bar displayed above the audio waveform, and movement of the horizontal bar represents an equal and concurrent application of an effect to both sides of the audio waveform.

15. A system, comprising:

one or more computers configured to perform operations including:

receiving digital audio data;

displaying a representation of received digital audio data as an audio waveform;

displaying a representation of one or more controls for applying one or more effects to the digital audio data;

receiving an input manipulating a first control relative to the audio waveform;

modifying the displayed representation of the audio waveform according to the position of the first control relative to a maximum amplitude of the representation of the audio waveform, wherein the representation of the audio waveform is modified to represent an application of an effect based on the relative position of the first control;

applying the effect to the digital audio data, the application of the effect corresponding to the modified displayed representation of the audio waveform, wherein an amount of the effect is based on a second control, the second control being a ratio control with a movable measure, and wherein moving the measure in a first direction applies a first amount of the effect and moving the measure in a second direction applies a second amount of the effect; and making the modified digital audio data available for further processing and output.

16. The system of claim 15, where the first control is a horizontal bar, and wherein applying the effect to the audio waveform includes:

moving the horizontal bar according to user input toward the audio waveform such that when the representation of the horizontal bar overlaps with the maximum amplitude displayed in the audio waveform, the effect is applied.

17. The system of claim 16, where the amount of the effect applied to the audio waveform corresponds to a position of the horizontal bar such that:

a maximum amount of the effect is applied when the horizontal bar is moved to a minimum amplitude of the audio waveform.

18. The system of claim 15, where the effect is a compression effect and applying the compression effect to the audio waveform includes means for applying the compression effect as determined by one or more of a threshold level, a ratio, and an output gain amount.

19. The system of claim 18, where when the compression effect is applied to the audio waveform, an amount of make-up gain is automatically applied.

20. The system of claim 16, where a first user-interactive graphic depiction of the one or more effects includes a second horizontal bar, such that:

the first horizontal bar is displayed above the audio waveform, the second horizontal bar is displayed below the audio waveform, and movement of the first horizontal bar causes a mirror movement of the second horizontal bar, causing the effect to be applied equally to both sides of the audio waveform.

21. The system of claim 15, where only half of the audio waveform is displayed, such that:

the displayed half of the audio waveform represents both sides of the audio waveform, the first user-interactive graphic depiction of the one or more effects is a horizontal bar displayed above the audio waveform, and movement of the horizontal bar represents an equal and concurrent application of an effect to both sides of the audio waveform.

* * * * *